(12) United States Patent
Lejin P J

(10) Patent No.: US 12,261,874 B2
(45) Date of Patent: Mar. 25, 2025

(54) LIBRARY SECURITY METHODS AND SYSTEMS USING A WEB APPLICATION FIREWALL

(71) Applicant: Salesforce, Inc., San Francisco, CA (US)

(72) Inventor: Jose Lejin P J, Bangalore (IN)

(73) Assignee: Salesforce, Inc.

( * ) Notice: Subject to any disclaimer, the term of this patent is extended or adjusted under 35 U.S.C. 154(b) by 226 days.

(21) Appl. No.: 18/169,692

(22) Filed: Feb. 15, 2023

(65) Prior Publication Data
US 2024/0275808 A1    Aug. 15, 2024

(51) Int. Cl.
H04L 9/40    (2022.01)

(52) U.S. Cl.
CPC .......... *H04L 63/1433* (2013.01); *H04L 63/02* (2013.01)

(58) Field of Classification Search
CPC .............................. H04L 63/1433; H04L 63/02
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |

(Continued)

*Primary Examiner* — Izunna Okeke
(74) *Attorney, Agent, or Firm* — Lorenz & Kopf, LLP

(57) ABSTRACT

Database systems and methods are provided for securing an instance of a web application from vulnerabilities in third party libraries using a web application firewall. One method involves receiving, at a web application firewall between an application server and a client, vulnerability information associated with the web application, generating, at the web application firewall, executable code for securing the instance of the web application based at least in part on the vulnerability information, providing, by the web application firewall, the executable code to the client over a network, and thereafter detecting a vulnerable library associated with the instance of the web application, wherein the client executes the executable code to secure the instance of the web application in response to detecting the vulnerable library.

20 Claims, 11 Drawing Sheets

(56) References Cited

U.S. PATENT DOCUMENTS

| | | |
|---|---|---|
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2021/0014245 A1* | 1/2021 | McKendall ............ G06F 21/54 |

* cited by examiner

```
Vulnerable_Libraries =
[
  {
    library: <Name of the library>,
    detector: <Function callback or property to detect presence of this library>,
    vulnerable_versions:
    [
      {
        version: <Version string of this specific library>,
        vulnerable_functions:
        [
          {
            obfuscated_function_name: <Function name in obfuscated format>,
            unobfuscated_function_name: <Function name in unobfuscated format>,
            obfuscated_hash: <Hash of the function contents in obfuscated format>,
            unobfuscated_hash: <Hash of the function contents in unobfuscated format>,
          },
          ......,
          ......,
          ...... // More vulnerable functions of this specific library version
        ]
      },
      ......,
      ......,
      ...... // More vulnerable versions of this specific library
    ]
  },
  ......, // More vulnerable libraries
  ......,
  ......
]
```

FIG. 3

```
{
  app_domain: <Domain of the web app>,
  3rd_party_libs:
  [
    {
      lib_name: <Name string of lib>,
      lib_version: <Version of lib>,
      lib_dependency: <LOW or MEDIUM or HIGH>,
      lib_fallback_objects: // Applicable only for lib dependency MEDIUM
      [
        {
          original_object: <Original object in 3rd party lib>,
          fallback_object: <Fallback object in case of vulnerability. Can be null also.>
        },
        ......,
        ......,
        ...... // More fallback objects
      ]
    },
    ......,
    ......,
    ...... // More 3rd party libs
  ]
}
```

FIG. 7

```
vulnerable_3rd_party_libs:
[
  {
    lib_name: <Name string of lib>,
    vulnerable_lib_versions:
    [
      {
        version: <One of the vulnerable version>,
        applicable_browsers:
        [
          <browser name-version>,
          ......,
          ......,
          ....... // More browser name-version
        ]
      },
      ......,
      ......,
      ...... // More vulnerable versions
    ]
  },
  ......,
  ......,
  ...... // More 3rd party libs
]
```

FIG. 8

LIBRARY SECURITY METHODS AND SYSTEMS USING A WEB APPLICATION FIREWALL

TECHNICAL FIELD

One or more implementations relate to the field of database systems, and more specifically, to a web application firewall residing between an application server and a client to facilitate detection of vulnerabilities in connection with an instance of a web application.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features.

Many modern web applications are developed using third-party libraries, such as, for example, jQuery, React, Angular, and/or the like. In practice, when a vulnerability in a third-party library is reported, a web application administrator or owner will update the libraries utilized in their web application to utilize a patched version that resolves the vulnerability. However, an attacker might hack or otherwise infiltrate and updated library to modify a specific function or handle within the updated library to include a vulnerability without modifying the versioning information or other aspects of the library, such that the presence of the vulnerability may be undetected by the web application administrator or owner (e.g., by virtue of the versioning information associated with the library being up to date). Accordingly, it is desirable to provide protections for web applications against vulnerabilities that were injected or otherwise inserted into a facially valid, updated library.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3 depicts exemplary library vulnerability information provided to a web application firewall service in connection with the vulnerability monitoring process of FIG. 2 according to some exemplary implementations;

FIG. 7 depicts exemplary library dependency information provided to a web application firewall service in connection with the vulnerability detection process of FIG. 6 according to some exemplary implementations;

FIG. 8 depicts exemplary library vulnerability information provided to a web application firewall service in connection with the vulnerability detection process of FIG. 6 according to some exemplary implementations;

DETAILED DESCRIPTION

Figure 1:
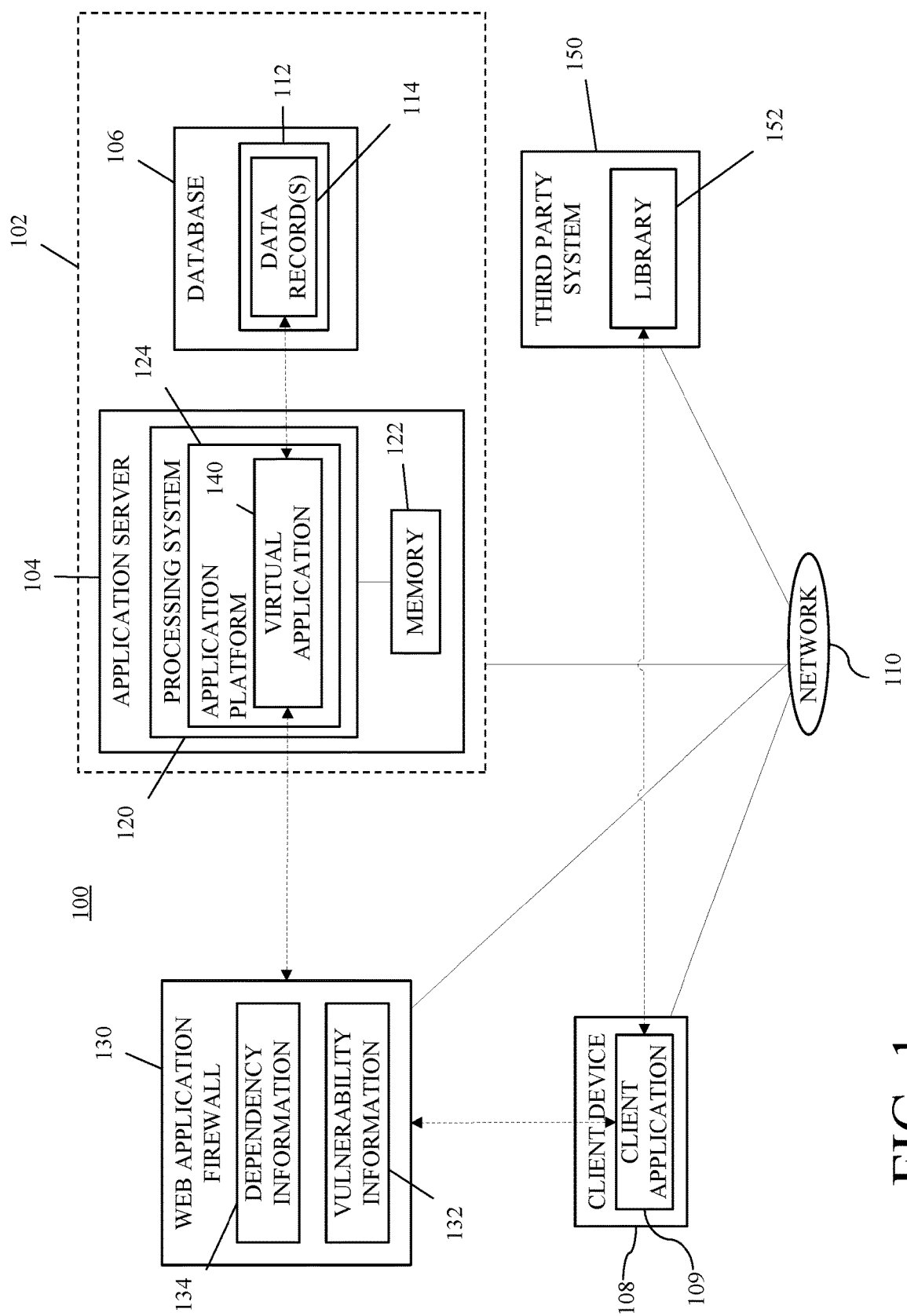
FIG. 1 is a block diagram illustrating a computing system that supports customizable automated invoice generation according to some exemplary implementations.

The following description describes implementations for deep detection of when a vulnerable library is used in an instance of a web application and exiting or terminating the instance of the web application prior to using the vulnerable library. A web application firewall (WAF) residing between an application server and a client creates, injects or otherwise generates executable code for securing an instance of a web application based at least in part on vulnerability information received at the web application firewall, for example, by an administrator or other user inputting or otherwise providing library vulnerability information associated with the web application to the web application firewall. The web application firewall provides the executable code to the client, which, in turn executes the code to detect the presence of a vulnerable library associated with the instance of the web application and secure the instance of the web application in response to detecting a vulnerable library. In this regard, the executable code generated and injected by the web application firewall enables the client to detect vulnerable libraries obtained from various network locations independent of the web application firewall or the application server, such as, for example, third-party libraries obtained from content delivery networks (CDNs) or other third-party sources or network locations without passing through the web application firewall.

For example, as described in greater detail below, an administrative user associated with a web application may input or otherwise provide, to a service associated with the web application firewall, library vulnerability information including information identifying vulnerable versions of a particular library utilized by the web application and the name(s) or other indicia of the vulnerable functions contained in the respective vulnerable version of that library. For each vulnerable function, the web application firewall service may calculate or otherwise determine a hash value of the contents of the respective function, for example, by converting the contents of the vulnerable version of the vulnerable function to a string and then computing a reference hash value of the string representation of the vulnerable function using a desired hashing algorithm (which may be selected by the administrative user). The service at the web application firewall stores or otherwise maintains the library vulnerability information and generates corresponding executable code to be injected at the client-side for identifying vulnerable functions in a retrieved library and comparing the hash value of the vulnerable function in a retrieved library to the reference hash value for that vulnerable function. Before sending code, data or other information for an instance of the web application code to the client, the web application firewall injects or otherwise provides the executable code, which, in turn, is executed by a web browser or other application at the client to provide a library monitoring service at the client-side that monitors for third-party libraries retrieved in connection with the web application.

The client-side library monitoring service utilizes the library vulnerability information to detect or otherwise identify the presence of a third-party library including a potentially vulnerable function (e.g., by matching the name of a function in the retrieved third-party library to the name of a previously-identified vulnerable function), and once detected, converts the contents of the potentially vulnerable function in the retrieved library to a string representation and then determines a corresponding hash value of the string representation of the potentially vulnerable function using the desired hashing algorithm. When the hash value of the potentially vulnerable function in the retrieved library matches the reference hash value for the known vulnerable version of the function provided by the web application firewall, the library monitoring service detects or otherwise identifies the retrieved library as vulnerable. In response, the library monitoring service may generate or otherwise provide a user notification at the client-side that notifies the user of the presence of a vulnerability before terminating or otherwise exiting the instance of the web application. Thus, even if an attacker were to modify a particular function within an updated, upgraded or ostensibly "good" version of the library, the client-side library monitoring service protects against the vulnerability by matching the function contents in the retrieved library to a known vulnerability.

FIG. 1 depicts an exemplary computing system 100 capable of securely provisioning an instance of a web application 140 from a server 104 of a database system 102 to a client application 109 at a client device 108 over a communications network 110 (e.g., the Internet or any sort or combination of wired and/or wireless computer network, a cellular network, a mobile broadband network, a radio network, or the like). It should be appreciated that FIG. 1 is a simplified representation of a computing system 100 and is not intended to be limiting.

In one or more exemplary implementations, the database system 102 includes one or more application servers 104 that support an application platform 124 capable of providing instances of virtual web applications 140, over the network 110, to any number of client devices 108 that users may interact with to view, access or obtain data or other information from one or more data records 114 maintained in one or more data tables 112 at a database 106 or other repository associated with the database system 102. For example, a database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual web applications 140 based upon data from a common database 106 that is shared between multiple tenants, which may alternatively be referred to herein as a multi-tenant database. Data and services generated by the virtual web applications 140 may be provided via the network 110 to any number of client devices 108, as desired, where instances of the virtual web application 140 may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records 114 maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receiver, transceivers, wired network interface controllers (e.g., an Ethernet adapter), wireless adapters or another suitable network interface that supports communications to/from the network 110 coupled thereto. The application server 104 also includes or otherwise accesses a data storage element 122 (or memory), and depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services that are configurable to subject matter described herein.

The client device 108 generally represents an electronic device coupled to the network 110 that may be utilized by a user to access an instance of the virtual web application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual web application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. The illustrated client device 108 executes or otherwise supports a client application 109 that communicates with the application platform 124 provided by the processing system 120 at the application server 104 to access an instance of the virtual web application 140 using a networking protocol. In some implementations, the client application 109 is realized as a web browser or similar local client application executed by the client device 108 that contacts the application platform 124 at the application server 104 using a networking protocol, such as the hypertext transport protocol (HTTP). In this manner, in one or more implementations, the client application 109 may be utilized to access or otherwise initiate an instance of a virtual web application 140 hosted by the database system 102, where the virtual web application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual web application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual web application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual web application 140, which may include custom objects and/or standard objects. For example, an administrator user associated with a particular resource owner may utilize an instance of a virtual web application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

Still referring to FIG. 1, the computing system 100 includes a web application firewall 130 that generally represents the software, hardware, and/or other components configurable to reside between the application server 104, the application platform 124 and/or the virtual web application 140 and the client devices 108 attempting to access instances of the virtual web application 140 and/or the database system 102 (e.g., via a web browser or other client application 109). In this regard, the web application firewall 130 may be configurable by an administrator associated with the database system 102 and/or the virtual web application 140 to monitor and filter requests, responses, and/or other network traffic to/from the database system 102 and/or the virtual web application 140. In exemplary implementations described herein, the web application firewall 130 includes or otherwise supports a web application firewall configuration service that allows an administrator user to interact with and configure the web application firewall 130 over the network 110 using a web browser or similar client application 109 at a client device 108.

As described in greater detail below, an administrative user associated with a virtual web application 140 (e.g., the web application administrator or owner) may utilize a web browser or similar client application 109 at the client device 108 to access the web application firewall configuration service associated with the web application firewall 130 to input or otherwise provide library vulnerability information associated with the web application 140 including, but not limited to, identification of the third-party libraries utilized by the virtual web application 140 to be monitored by a library monitoring service and the potentially vulnerable functions contained therein. For example, the administrative user may input or otherwise provide a JavaScript Object Notation (JSON) file or data structure that includes information identifying the vulnerable versions of a respective library utilized by the virtual web application 140 along with information identifying the vulnerable functions associated with the library. In this regard, when a third-party library used in a web application is detected or identified as being vulnerable, the owner or publisher of the library may announce the vulnerability and provide information identifying the vulnerable functions associated with the vulnerability. In response to a vulnerability associated with a library utilized by the virtual web application 140, an administrative user may upload or otherwise provide a JSON file to the web application firewall configuration service that includes the name of the potentially vulnerable library to be monitored for, the callback or property utilized to detect presence of the potentially vulnerable library, along with information identifying the vulnerable versions of the library, the names of the potentially vulnerable functions associated with the library (in both unobfuscated and obfuscated formats), and respective hash values of the string representation of the respective unobfuscated and obfuscated formats of a respective vulnerable function. In this regard, in addition to providing the library vulnerability information, the administrative user may also select or otherwise provide identification of the hashing algorithm utilized to determine the respective hash values for the vulnerable functions (e.g., a Secure Hash Algorithm (e.g., SHA-2, SHA-3, etc.) or another suitable cryptographic hashing algorithm).

When a client, customer or other end user of the virtual web application 140 utilizes the client application 109 to retrieve or otherwise access an instance of the virtual web application 140 over the network 110, the request is transmitted, routed, or otherwise provided to the web application firewall 130, which, in turn, retrieves the executable code, files or other data for generating the virtual web application 140 from the application server 104 and/or the database 106. In connection with providing the executable code, files or other data for generating the virtual web application 140 to the client application 109 responsive to the request, the web application firewall 130 utilizes the library vulnerability information associated with the web application 140 to generate executable code for implementing a client-side library monitoring service that is configured to secure the instance of the virtual web application 140 with respect to the potential vulnerabilities defined by the web application administrator. The web application firewall 130 injects or otherwise incorporates the executable code for the client-side library monitoring service with the executable code or other data for generating the virtual web application 140, for example, as a JavaScript file or variable included in or invoked by one or more of the HyperText Markup Language (HTML) files associated with the virtual web application 140 that are provided by the web application firewall 130 to the client application 109 responsive to the request to access the virtual web application 140.

The client application 109 at the client device 108 receives the response from the web application firewall 130 that includes the executable code, files or other data for generating an instance of the virtual web application 140 along with the injected code for generating the client-side library monitoring service. The client application 109 reads or otherwise executes the response to generate the instance of the virtual web application 140 at the client device 108, which, in turn results in the client application 109 executing the generated code injected by the web application firewall 130 to provide the client-side library monitoring service in connection with the instance of the virtual web application 140. Thereafter, during execution of the virtual web application 140, the client application 109 may retrieve one or more third-party libraries 152 from one or more third party computing systems 150 (e.g., a CDN) on the network 110. For example, an HTML file or other code associated with generating the instance of the virtual web application 140 may include a hyperlink or other reference to a network address or location associated with the third party computing system 150 on the network 110 from which one or more particular libraries 152 are to be retrieved or otherwise obtained in order to support some functionality of the virtual web application 140 using the third-party library(s) 152 (e.g., jQuery, React, and/or the like). In this regard, the third party computing system 150 generally represents a server or other computing system communicatively coupled to the network 110 that supports remote access to one or more libraries 152 maintained at the third party computing system 150. In practice, the third party computing system 150 is physically and logically distinct from the database system 102 and/or the application server 104. For example, the third party computing system 150 may reside at a different physical location than the database system 102 and/or the application server 104 and be owned, controlled, or otherwise operated by a third party different from the party that owns, controls and/or operates the database system 102 and/or the application server 104.

After retrieving a library 152 to be utilized by the virtual web application 140, the client-side injected library monitoring service utilizes library vulnerability information defined for the virtual web application 140 to analyze the library 152 to detect whether the library 152 includes a potential vulnerability. In this regard, the client-side library monitoring service is provisioned or otherwise configured with the JSON data and hashing algorithm information defined by the web application administrator to detect the presence of a potentially vulnerable library using the name of the potentially vulnerable library to be monitored for and/or the defined callback or property for detecting presence of the potentially vulnerable library. When the library 152 is identified as potentially vulnerable, the client-side library monitoring service utilizes the vulnerable specific function information to identify whether the library 152 includes one of the potentially vulnerable functions defined by the web application administrator.

In response to detecting a potentially vulnerable function in a retrieved library 152, the client-side library monitoring service determines a hash value of the contents of any potentially vulnerable function identified within the library 152 using the hashing algorithm defined by the web application administrator. The client-side library monitoring service compares the determined hash value for the potentially vulnerable function(s) in the retrieved library 152 to the reference hash value for the potentially vulnerable function(s) defined by the web application administrator. When the determined hash value of a function in the retrieved library 152 matches the reference hash value corresponding to a vulnerable version of the function, the client-side library monitoring service determines that the retrieved library 152 includes a potential vulnerability in the form of a vulnerable function. In this regard, even if an attacker attempts to bypass security protections by modifying handles or functions associated with the retrieved library 152 to return or otherwise indicate that the retrieved library 152 is an updated, upgraded, patched or otherwise uncompromised version, the configured client-side monitoring service will still detect presence of vulnerable libraries and secure the instance of the virtual web application 140, whether the retrieved library 152 is in obfuscated or unobfuscated format.

In response to detecting presence of a vulnerable function in the retrieved library 152, in exemplary implementations, the client-side library monitoring service prevents execution, implementation or utilization of the retrieved library 152 by terminating, escaping or otherwise exiting the instance of the virtual web application 140. In one or more implementations, the client-side library monitoring service automatically generates a user notification at the client device 108 (e.g., via a JavaScript function executed by the web browser or other client application 109) that notifies the client end user of the web application 140 that a vulnerable library was detected in the web application 140. In some implementations, the client-side library monitoring service transmits or otherwise provides notification of the detected vulnerability associated with the instance of the virtual web application 140 to the web application firewall 130, for example, by providing notification to an exposed Representational State Transfer (REST) application programming interface (API) endpoint that is configured to receive information pertaining to detected vulnerabilities. In this regard, the web application firewall 130 may record information detailing the detected vulnerabilities identified by different clients in connection with different instances of the virtual web application 140, such as, for example, information identifying the name of the library exhibiting the vulnerability, the version of the library exhibiting the vulnerability, the name of the vulnerable function detected within the library, the uniform resource locator (URL), network address or other identifying information associated with the third party system 150 from which the vulnerable library was obtained, and/or the like. The web application firewall configuration service may generate or otherwise provide one or more reports, notifications, messages, and/or the like for the web application administrator based at least in part on the recorded detected vulnerability information, thereby allowing the web application administrator to review the detected vulnerabilities and make corresponding modifications to the web application 140 (e.g., by changing or updating code of the web application 140 to retrieve a particular library from a different source on the network 110, and/or the like) and/or the web firewall application configuration service.

Figure 2:
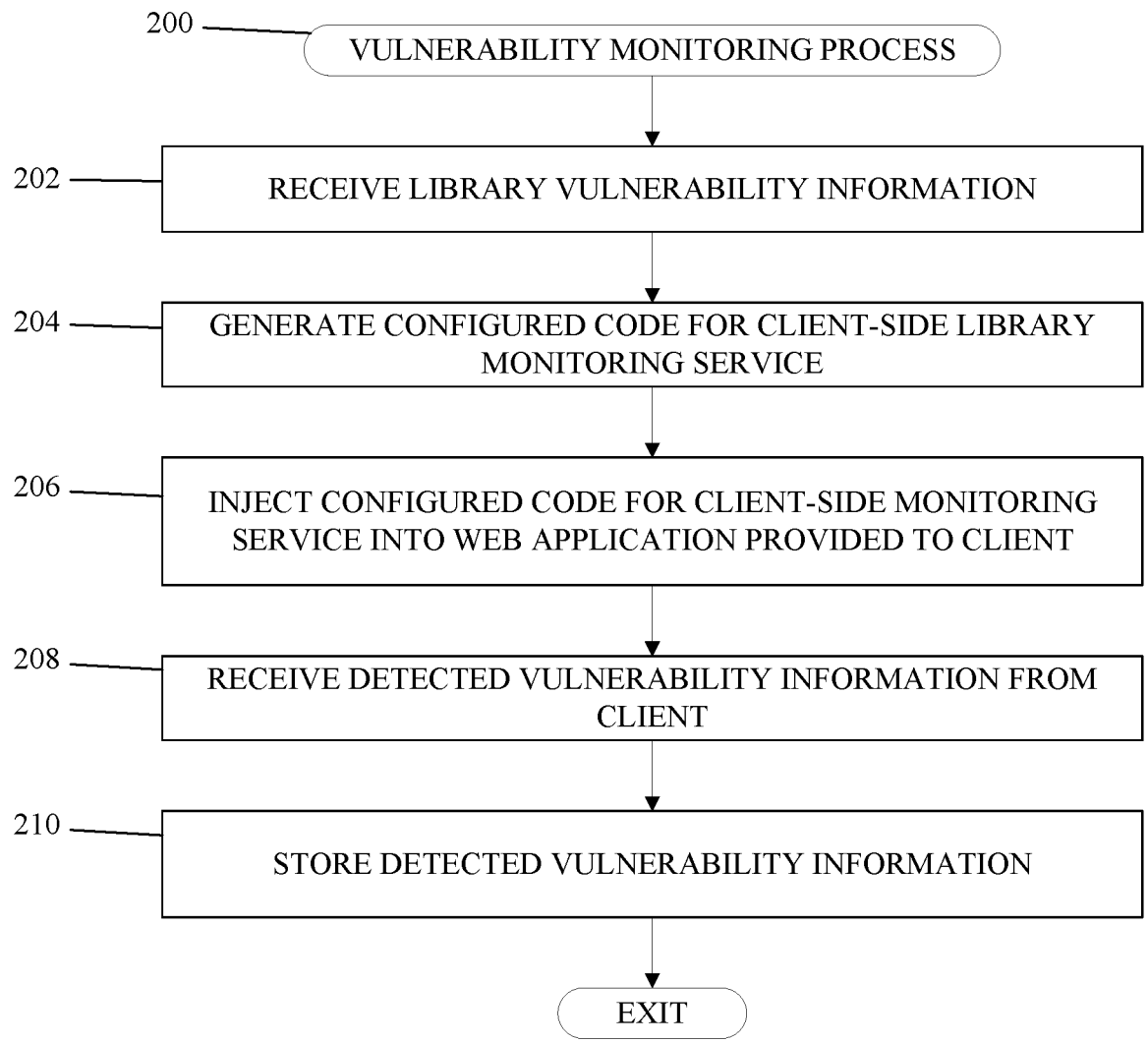
FIG. 2 is a flow diagram illustrating a vulnerability monitoring process suitable for implementation in connection with the web application firewall in the computing system of FIG. 1 according to some example implementations.

FIG. 2 depicts an exemplary vulnerability monitoring process 200 suitable for implementation by a web application firewall (e.g., web application firewall 130) to support client-side detection of vulnerable functions in libraries retrieved from third party sources (e.g., third party system 150) and perform additional tasks, functions, and/or operations described herein. For illustrative purposes, the following description may refer to elements mentioned above in connection with FIG. 1. It should be appreciated that the vulnerability monitoring process 200 may include any number of additional or alternative tasks, the tasks need not be performed in the illustrated order and/or the tasks may be performed concurrently, and/or the vulnerability monitoring process 200 may be incorporated into a more comprehensive procedure or process having additional functionality not described in detail herein. Moreover, one or more of the tasks shown and described in the context of FIG. 2 could be omitted from a practical implementation of the vulnerability monitoring process 200 as long as the intended overall functionality remains intact.

Referring to FIG. 2 with continued reference to FIG. 1, the vulnerability monitoring process 200 begins with the web application firewall receiving or otherwise obtaining information identifying potential vulnerabilities associated with one or more third party libraries utilized by a web application (task 202). As described above, a web application administrator or other user affiliated with the web application 140 may utilize a web browser or similar client application 109 to interact with a web application firewall configuration service at the web application firewall 130 to input or otherwise provide library vulnerability information 132 to be maintained by the web application firewall 130 and utilized by the web application firewall 130 to configure client-side monitoring services to be injected into instances of the web application 140. For example, FIG. 3 depicts exemplary library vulnerability information in a JSON data format that may be input or otherwise provided to the web application firewall configuration service at the web application firewall 130. As depicted in FIG. 3, the library vulnerability JSON data includes the name of the potentially vulnerable libraries to be monitored for, the callback or property utilized to detect presence of the respective library, along with information identifying the vulnerable versions of the respective library, the names of the potentially vulnerable functions associated with the respective library (in both unobfuscated and obfuscated formats), and the respective reference hash values of the string representation of the respective unobfuscated and obfuscated formats of the respective vulnerable functions. Additionally, in exemplary implementations, the web application administrator also inputs or otherwise defines the hashing algorithm associated with the reference hash values provided with the library vulnerability information.

Referring again to FIG. 3, after receiving the library vulnerability information, the vulnerability monitoring process 200 continues by automatically generating or otherwise creating code for a client-side library monitoring service configured in accordance with the received library vulnerability information associated with a respective web application and then automatically injecting or otherwise incorporating the configured client-side library monitoring service into an instance of that web application to be provided to a client (tasks 204, 206). In this regard, in response to receiving a request for an instance of a virtual web application 140 supported by the database system 102, the web application firewall 130 identifies the configured library vulnerability information 132 associated with the respective virtual web application 140 and automatically generates JavaScript or other executable code configurable to support a client-side library monitoring service and then incorporates or otherwise includes the generated code into the instance of the virtual web application 140 provided to the client application 109, for example, by inserting the executable code as a JavaScript file or variable in an HTML file associated with the virtual web application 140. Thereafter, when the client application 109 reads and executes the HTML files or other code associated with the virtual web application 140, the client application 109 also reads and executes the injected executable code provided by the web application firewall 130 to implement a configured library monitoring service within the client application 109 at the client device 108.

Figure 4:
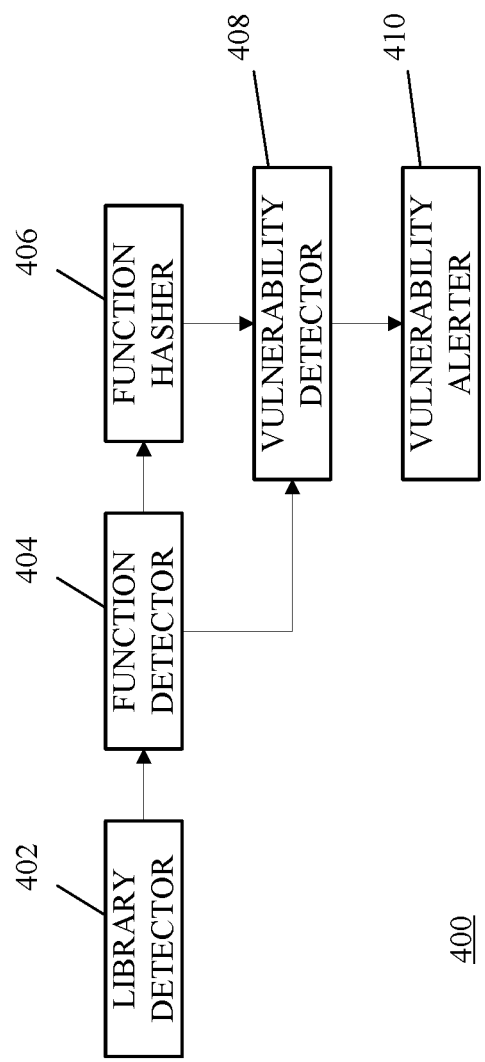
FIG. 4 is a block diagram of an exemplary library monitoring service suitable for implementation at a client in connection with the vulnerability monitoring process of FIG. 2 according to some exemplary implementations.

FIG. 4 depicts an exemplary implementation of a client-side library monitoring service 400 that may be automatically generated or otherwise configured by the web application firewall 130 in accordance with the library vulnerability information 132 provided by a web application administrator. In this regard, the depicted components 402, 404, 406, 408, 410 represent the configured software components or subprocesses associated with the client-side library monitoring service 400 that may be generated or otherwise instantiated by the client application 109 at the client device 108 in response to executing the injected code for the client-side library monitoring service 400 provided by the web application firewall 130. The client-side library monitoring service 400 includes a library detection component 402 (or library detector) that is configurable to detect or otherwise identify when the instance of the virtual web application 140 has loaded (e.g., by listening to detect an onload event generated by the web browser or other client application 109), and in response, the library detector 402 automatically uses the configured callbacks to detect presence of any potentially vulnerable libraries that may have been retrieved from a third party source in connection with loading the web application 140. In response to detecting the presence of a potentially vulnerable library, the library detector 402 notifies a vulnerable function detection component 404 (or function detector) that is configurable to detect or otherwise identify whether the potentially vulnerable libraries that were retrieved or loaded in connection with the web application 140 include one or more of the potentially vulnerable functions defined for the respective library.

When the function detector 404 identifies a potentially vulnerable function contained in a retrieved third party library, in unobfuscated or obfuscated form, the function detector 404 provides corresponding indication of the detected function to a vulnerable function hashing component 406 (or function hasher) that is configurable to generate a hash value representation of the detected function using the desired hashing algorithm configured by the web application administrator. The function hasher 406 identifies or otherwise obtains the contents of the detected function and converts the contents of the detected function into a string representation before inputting the string representation of the detected function into the desired hashing algorithm to obtain a hash value representation of the detected function in the retrieved library. The function hasher 406 provides the resulting hash value of the detected function in the retrieved library to a vulnerability detection component 408 (or vulnerability detector). The vulnerability detection component 408 receives indication of the detected function from the function detector 404, identifies or otherwise obtains the corresponding reference hash value for the detected function provided by the web application administrator, and then compares the reference hash value for the detected function to the generated hash value provided by the function hasher 406. When the hash values match, the vulnerability detector 408 detects the presence of a vulnerable function in the retrieved library and provides corresponding indication of a detected vulnerability to a vulnerability alerting component 410 (or vulnerability alerter). The vulnerability alerter 410 automatically generates or otherwise provides one or more user notifications or alerts of the detected vulnerability to the user of the client device 108 (e.g., via the client application 109) before the client-side library monitoring service 400 terminates, escapes or otherwise exits the web application 140. Additionally, in some implementations, the vulnerability alerter 410 automatically generates or otherwise provides one or more notifications or alerts of the detected vulnerability to the web application firewall 130 that includes detected vulnerability information.

Referring again to FIG. 2, the illustrated vulnerability monitoring process 200 receives or otherwise obtains detected vulnerability information from the client and then stores or otherwise maintains the detected vulnerability information for subsequent analysis (tasks 208, 210). For example, as described above, in one or more implementations, the client-side library monitoring service may transmit or otherwise provide notification of a detected vulnerability to the web application firewall 130 (e.g., via a REST API endpoint associated with the web application firewall 130) that includes information associated with the detected vulnerability that may allow a web application administrator to analyze the detected vulnerabilities and initiate appropriate remedial actions to mitigate vulnerabilities. Depending on the implementation, the detected vulnerability information may be stored or otherwise maintained in a data storage element associated with the web application firewall 130, while in other implementations, the web application firewall 130 may upload or otherwise store the detected vulnerability information in the database 106 associated with the database system 102 (e.g., via one or more APIs associated with the application platform 124).

Figure 5:
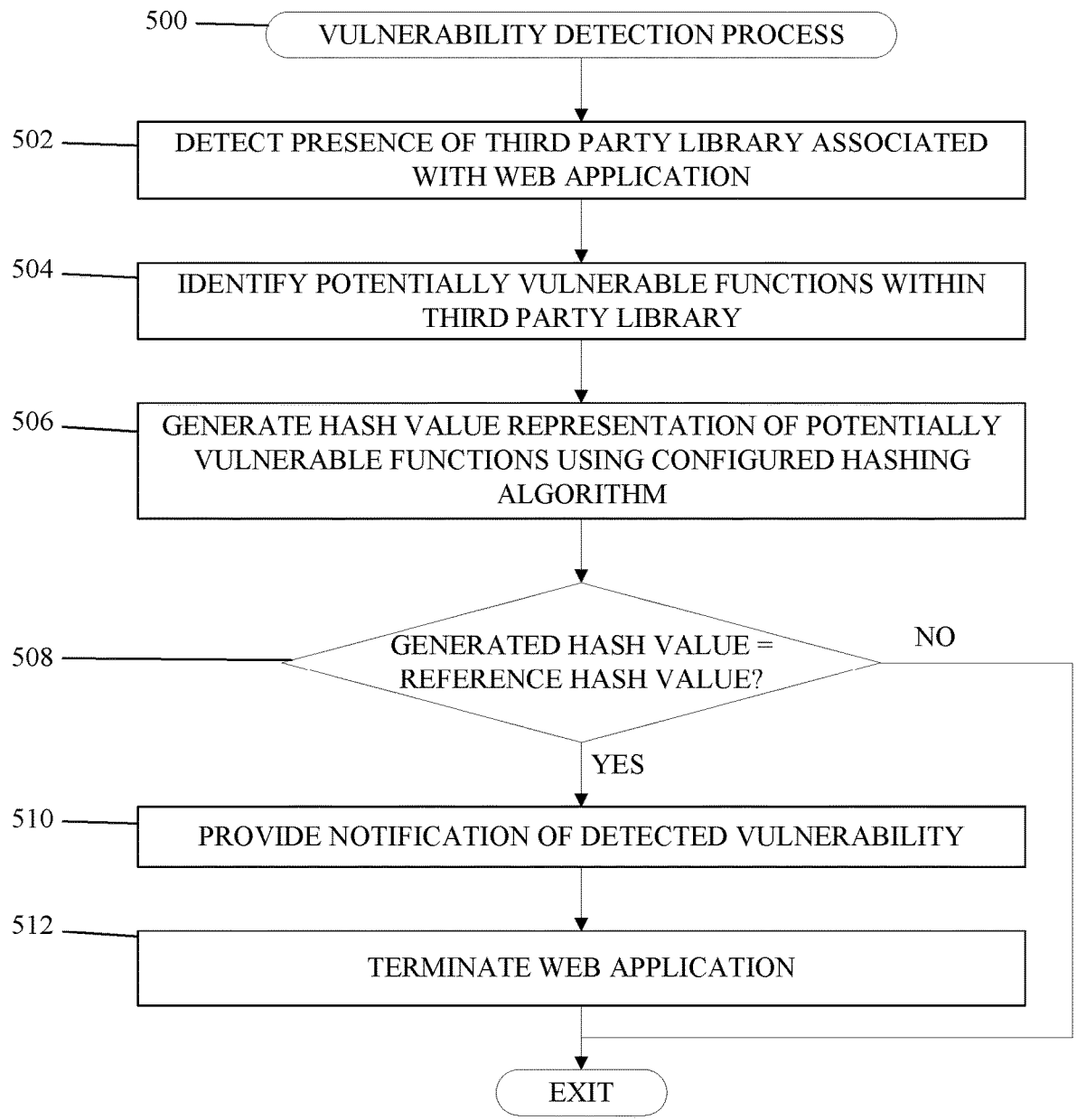
FIG. 5 is a flow diagram illustrating a vulnerability detection process suitable for implementation by a client application at a client device in the computing system of FIG. 1 according to some example implementations.

FIG. 5 depicts an exemplary client-side vulnerability detection process 500 suitable for implementation by a client to detect vulnerable functions in libraries retrieved from third party sources (e.g., third party system 150) and perform additional tasks, functions, and/or operations described herein. For illustrative purposes, the following description may refer to elements mentioned above in connection with FIGS. 1-4. It should be appreciated that the vulnerability detection process 500 may include any number of additional or alternative tasks, the tasks need not be performed in the illustrated order and/or the tasks may be performed concurrently, and/or the vulnerability detection process 500 may be incorporated into a more comprehensive procedure or process having additional functionality not described in detail herein. Moreover, one or more of the tasks shown and described in the context of FIG. 5 could be omitted from a practical implementation of the vulnerability detection process 500 as long as the intended overall functionality remains intact.

Referring to FIG. 5 with continued reference to FIGS. 1-4, the vulnerability detection process 500 begins by automatically detecting or otherwise identifying the presence of a potentially vulnerable third party library associated with a web application (task 502). For example, as described above, in response to detecting an onload event associated with an instance of a virtual web application 140 within a web browser or similar client application 109, the library detector 402 associated with the injected library monitoring service 400 executing within the client application 109 utilizes the previously-defined and configured callbacks to identify presence of any potentially vulnerable libraries 152 that may have been retrieved from a third party system 150. In this regard, a potentially vulnerable third party library 152 may be loaded into the web browser cache, but by virtue of the injected library monitoring service 400 starting on the HTML page load, the potentially vulnerable third party library 152 can be detected before it starts executing.

In response to detecting presence of a potentially vulnerable library, the vulnerability detection process 500 begins by automatically detecting or otherwise identifying the presence of a potentially vulnerable function within the respective library (task 504). For example, as described above, the function detector 404 associated with the injected library monitoring service 400 executing within the client application 109 utilizes the previously defined vulnerable function information to identify presence of any potentially vulnerable functions within a library 152 retrieved from a third party system 150.

In response to identifying a potentially vulnerable function, the vulnerability detection process 500 continues by automatically generating a hash value representation of the potentially vulnerable function using the configured hashing algorithm defined by the web application administrator and compares the resulting hash value to a predefine or predetermined reference hash value associated with the respective function (tasks 506, 508). For example, as described above, the function hasher 406 associated with the injected library monitoring service 400 executing within the client application 109 uses the desired hashing algorithm configured by the web application administrator to hash the contents of the detected function and provides the resulting hash value to the vulnerability detector 408 for comparison with a previously configured reference hash value for the corresponding vulnerable function.

When the generated hash value for the identified function in the potentially vulnerable library matches the reference hash value of either the obfuscated or unobfuscated version of that vulnerable function, the vulnerability detection process 500 automatically generates or otherwise provides notification of a detected vulnerability with respect to the library retrieved from the third party source and then automatically terminates or otherwise exits the instance of the web application (tasks 510, 512). In this regard, as described above, the client-side library monitoring service may automatically generate one or more user notifications within the client application 109 at the client application 109 to notify the user of the presence of a vulnerability and correspondingly provide one or more notifications to the web application firewall 130 to log or otherwise record detected vulnerability information before terminating the instance of the virtual web application 140 at the client device 108.

By virtue of the vulnerability detection process 500 in connection with the vulnerability monitoring process 200 supported by the web application firewall 130, the subject matter described herein enables deep detection of vulnerable functions that may be otherwise hidden in libraries obtained from third party sources that would otherwise appear to be valid, patched, updated, upgraded, or otherwise up to date. In this regard, the subject matter described herein may be implemented using pluggable web application firewall components without any dependency on the server side or the client-side web application being used to access the web application, that is, the subject matter may be implemented with any sort of web application firewall and web browser combination. Moreover, the subject matter described herein provides flexibility for the web application administrator or owner to define or otherwise configure the libraries used in the web application for which protection is desired, and for different vulnerable versions. Thus, even if a malicious actor modifies the library versioning information (or handles or functions that return versioning information) to appear valid and trustworthy, vulnerable functions contained within the library can still be detected, thereby allowing execution of the web application to be immediately and automatically stopped without compromising either the client-side or the server-side of the web application.

Referring now to FIGS. 6-9, in practice, a vulnerability associated with a particular library may be published or otherwise reported (alternatively referred to as a vulnerability incident) while web applications are in use by any number of different end users. Some vulnerabilities may pose relatively greater risks that could necessitate stopping any active instances of web applications that are currently running on client-side web browsers as soon as possible, while other vulnerabilities may pose relatively limited risks that could be mitigated without stopping any active instances of web applications. Accordingly, exemplary implementations described herein also provide methods for securing web applications from the client-side in a customizable and intelligent manner in response to a newly identified vulnerability without having to resort to switching off application servers. In this regard, switching off, restarting or disabling the application servers in response to a vulnerability incident also stops or disables API endpoints hosted at the server(s), thereby disrupting users of those endpoints, while still allowing active instances of the web application to continue running client-side (e.g., since previously downloaded or loaded HTML pages may still be active), thereby degrading user experience and disrupting users of the active instances of the web application when the respective web application instance begins exhibiting anomalous behavior in the absence of an application server(s) which may be needed to support API calls or other backend, server-side functionality associated with the web application.

In exemplary implementations, an administrative user associated with a web application may input or otherwise provide, to a service associated with the web application firewall, library dependency information including information identifying the name or other identifier associated with a particular library utilized by the web application associated with a particular web application domain, the version of that library utilized by the web application, a dependency classification or categorization associated with that library, and a fallback object in the library to be utilized as an alternative to an original object in the library in response to a vulnerability incident. For example, in one or more implementations, the dependency categories include a low dependency category, a medium dependency category, and a high dependency category. The low dependency category is generally assigned to libraries that are utilized for usability, graphics, cosmetics or aesthetic effects, where the web application is capable of functioning normally in terms of its core functionality in the absence of a low dependency library. The medium dependency category is generally assigned to libraries where the web application is capable of functioning in an impaired manner with some impacts in the absence of the respective library, but where a fallback may exist to continue to support some functionalities of the web application. For example, a standard XMLHttpRequest object may be utilized as a fallback object in lieu of an XMLHttpRequest JavaScript object wrapped in a third party library that would otherwise be utilized by the web application to provide better functionality. A high dependency category, on the other hand, is generally assigned to libraries where the web application is incapable of functioning in the absence of the respective library, such as, for example, a core or main library associated with the web application (e.g., jQuery, React, Angular, etc.).

The service at the web application firewall stores or otherwise maintains the library dependency information and generates corresponding executable code to be injected at the client-side for responding to a subsequent vulnerability incident in accordance with the library dependency information. The injected executable code is executed by a web browser or other application at the client to provide a vulnerability handling service at the client-side that manages client-side behavior when the service at the web application firewall identifies that a client is using a vulnerable version of a third party library in connection with an instance of a web application that is already active and running at the client.

Figure 6:
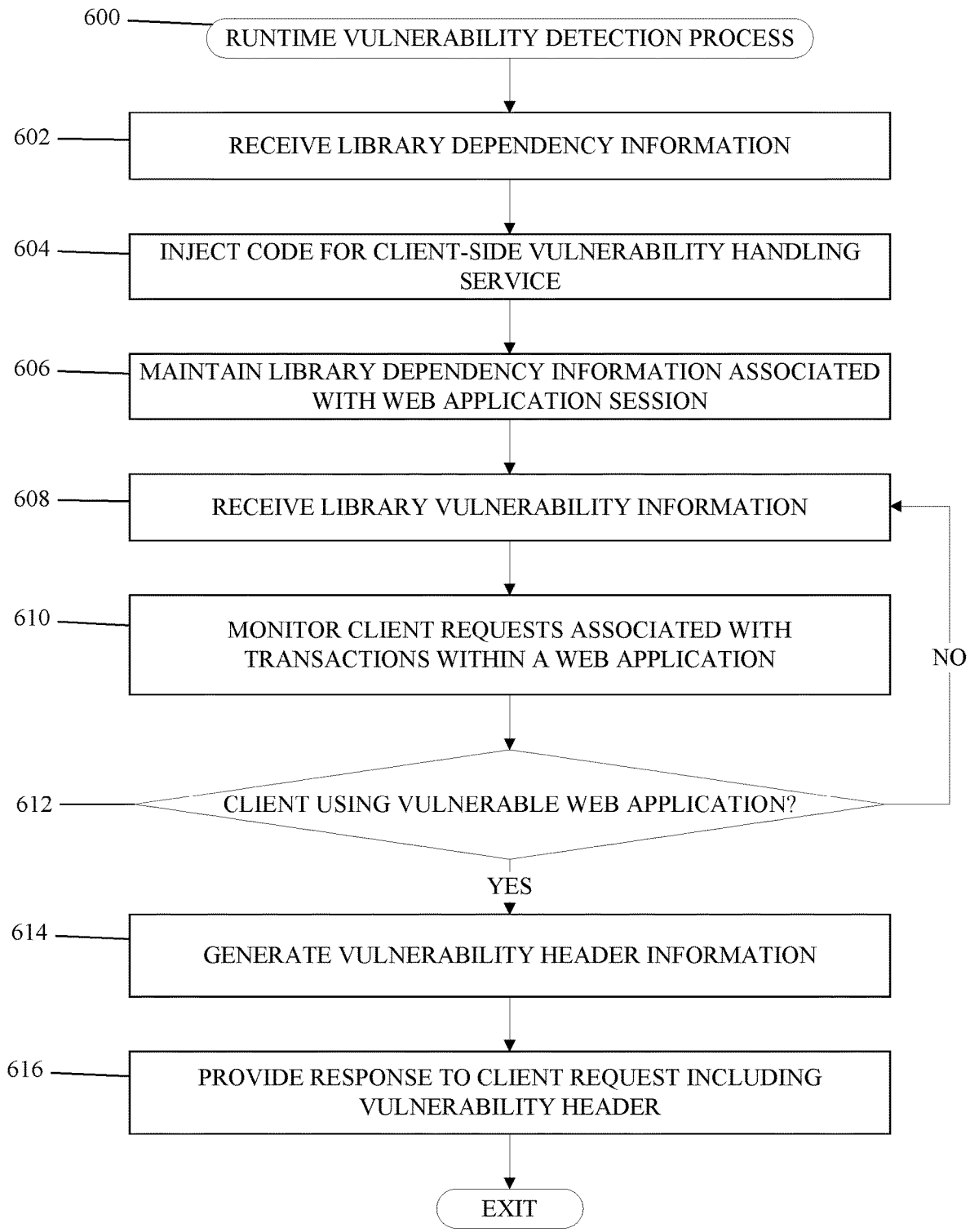
FIG. 6 is a flow diagram illustrating a runtime vulnerability detection process suitable for implementation by a web application firewall in the computing system of FIG. 1 according to some example implementations.

FIG. 6 depicts an exemplary runtime vulnerability detection process 600 suitable for implementation by a web application firewall (e.g., web application firewall 130) to support detection of instances of web applications using vulnerable libraries retrieved from third party sources (e.g., third party system 150) and perform additional tasks, functions, and/or operations described herein. For illustrative purposes, the following description may refer to elements mentioned above in connection with FIG. 1. It should be appreciated that the vulnerability detection process 600 may include any number of additional or alternative tasks, the tasks need not be performed in the illustrated order and/or the tasks may be performed concurrently, and/or the vulnerability detection process 600 may be incorporated into a more comprehensive procedure or process having additional functionality not described in detail herein. Moreover, one or more of the tasks shown and described in the context of FIG. 6 could be omitted from a practical implementation of the vulnerability detection process 600 as long as the intended overall functionality remains intact.

The runtime vulnerability detection process 600 begins with the web application firewall receiving or otherwise obtaining library dependency information characterizing utilization of one or more third party libraries in connection with a web application (task 602). In a similar manner as described above, a web application administrator or other user affiliated with the web application 140 may utilize a web browser or similar client application 109 to interact with a web application firewall configuration service at the web application firewall 130 to input or otherwise provide library dependency information 134 to be maintained by the web application firewall 130 and utilized by the web application firewall 130 to identify when a client is using a vulnerable version of a third party library 152 in connection with an instance of a web application 140 that is already active and running at the client device 108. For example, FIG. 7 depicts exemplary library dependency information in a JSON data format that may be input or otherwise provided to the web application firewall configuration service at the web application firewall 130. As depicted in FIG. 7, the library dependency JSON data includes identification of the network domain associated with the web application 140, the names and versions of the third party libraries 152 utilized by the web application 140, the respective dependency of the web application 140 on a respective third party library 152, and identification of fallback objects to be utilized in lieu of original objects associated with a particular library 152 in response to a vulnerability associated with the library 152, depending on the dependency associated with that library 152.

Referring again to FIG. 6, the runtime vulnerability detection process 600 continues by automatically generating or otherwise creating code for a client-side vulnerability monitoring service associated with a respective web application and then automatically injecting or otherwise incorporating the configured client-side vulnerability handling service into an instance of that web application to be provided to a client (task 604). In a similar manner as described above, in response to receiving a request for an instance of a virtual web application 140 supported by the database system 102, the web application firewall 130 automatically generates JavaScript or other executable code configurable to support a client-side vulnerability handling service and then incorporates or otherwise includes the generated code into the instance of the virtual web application 140 provided to the client application 109, for example, by inserting the executable code as a JavaScript file or variable in an HTML file associated with the virtual web application 140. Thereafter, when the client application 109 reads and executes the HTML files or other code associated with the virtual web application 140, the client application 109 also reads and executes the injected executable code provided by the web application firewall 130 to implement a vulnerability handling service within the client application 109 at the client device 108. As described in greater detail below in the context of FIG. 9, the client-side vulnerability handling service is configured to interact with a web application firewall vulnerability controller service to support securing the web application 140 in a customizable manner from the client side.

In exemplary implementations, the runtime vulnerability detection process 600 also stores or otherwise maintains session information associated with a respective client that maintains the library dependency information associated with the respective web application session (task 606). In this regard, the vulnerability controller service at the web application firewall 130 analyzes the network domain associated with the requested web application 140 being provided to the requesting client application 109 to identify the library dependency information associated with that web application session and then stores or otherwise maintains the library dependency information for that web application session in association with the particular client application 109 and/or the particular active instance of the web application 140. For example, the vulnerability controller service at the web application firewall 130 may copy the names and versions of the third party libraries 152 utilized in the particular web application 130 from the library vulnerability JSON data associated with that particular network domain along with the library dependency and fallback object information and maintain the library dependency information in session memory at the web application firewall 130 in association with the identifying information associated with the client application 109 and/or the client device 108 (e.g., a session identifier, a network address, and/or the like) for as long as the session associated with that client is maintained active.

Still referring to FIG. 6, the runtime vulnerability detection process 600 periodically receives, identifies or otherwise obtains information identifying one or more vulnerabilities associated with a third party library (task 608). In this regard, when a vulnerability associated with a third party library 152 is published or otherwise identified (e.g., a vulnerability incident), the vulnerability controller service at the web application firewall 130 obtains information identifying the name of the vulnerable library, the vulnerable version(s) of that library, and the vulnerable web browser(s) associated with the vulnerability. For example, in a similar manner as described above, a web application administrator or other user affiliated with the web application 140 may utilize a web browser or similar client application 109 to interact with a web application firewall configuration service at the web application firewall 130 to input or otherwise provide library vulnerability information 132 to be maintained by the web application firewall 130. In other implementations, the vulnerability controller service at the web application firewall 130 may provide or otherwise be associated with an API endpoint configurable to receive the library vulnerability information 132. For example, FIG. 8 depicts exemplary library vulnerability information in a JSON data format that may be input or otherwise provided to the web application firewall 130.

After receiving library vulnerability information, the runtime vulnerability detection process 600 continues by analyzing or otherwise monitoring client requests associated with transactions within the context of the web application to detect or otherwise identify when a client is potentially using a vulnerable library in connection with the active instance of the web application (tasks 610, 612). For example, as described in greater detail below, the injected executable code for the client-side vulnerability handling service may cause the client application 109 to transmit or otherwise provide requests relating to transactions within the context of the active instance of the web application 140 to the web application firewall 130 that include indication of the network domain associated with the active instance of the web application 140. The vulnerability controller service at the web application firewall 130 intercepts the client request prior to relaying them on to the application server 104. The vulnerability controller service at the web application firewall 130 utilizes the session identifier associated with the client request to identify the library dependency information 134 associated with the respective web application 140 maintained in association with that web application session at the web application firewall 130, and then analyzes the library dependency information 134 in relation to the library vulnerability information 132 to determine whether the web application 140 associated with that network domain is utilizing a particular version of a particular third party library 152 that matches the vulnerable version of that particular third party library 152 that was identified as containing a vulnerability (e.g., by matching library name and version information contained in an instance of library dependency information 134 to corresponding library name and version information in an instance of library vulnerability information 132). In response to subsequent client requests, the loop defined by tasks 608, 610 and 612 repeats to update the library vulnerability information 132 as vulnerability incidents occur and continually analyze client requests as they are received to detect when a potentially vulnerable web application is being utilized substantially in real-time once a vulnerability incident is published.

In response to determining the client is using a potentially vulnerable web application that utilizes a particular version of a third party library identified as vulnerable, the runtime vulnerability detection process 600 continues by automatically generating, on the web application firewall side, header information identifying the vulnerability and providing a response to the client request that includes the vulnerability header (tasks 614, 616). To generate the vulnerability header, the vulnerability controller service at the web application firewall 130 utilizes the library dependency information 134 that was matched to the library vulnerability information 132 to construct a header that identifies the name and version of the vulnerable library, the vulnerable web browsers associated with the vulnerability, the dependency associated with the vulnerable library, and the fallback object to be used in lieu of a particular original object associated with that vulnerable library. The vulnerability controller service at the web application firewall 130 automatically injects or otherwise incorporates the vulnerability header with any response to the client request received from the application server 104 and/or the application platform 124 before providing the response to the client application 109 at the client device 108.

Figure 9:
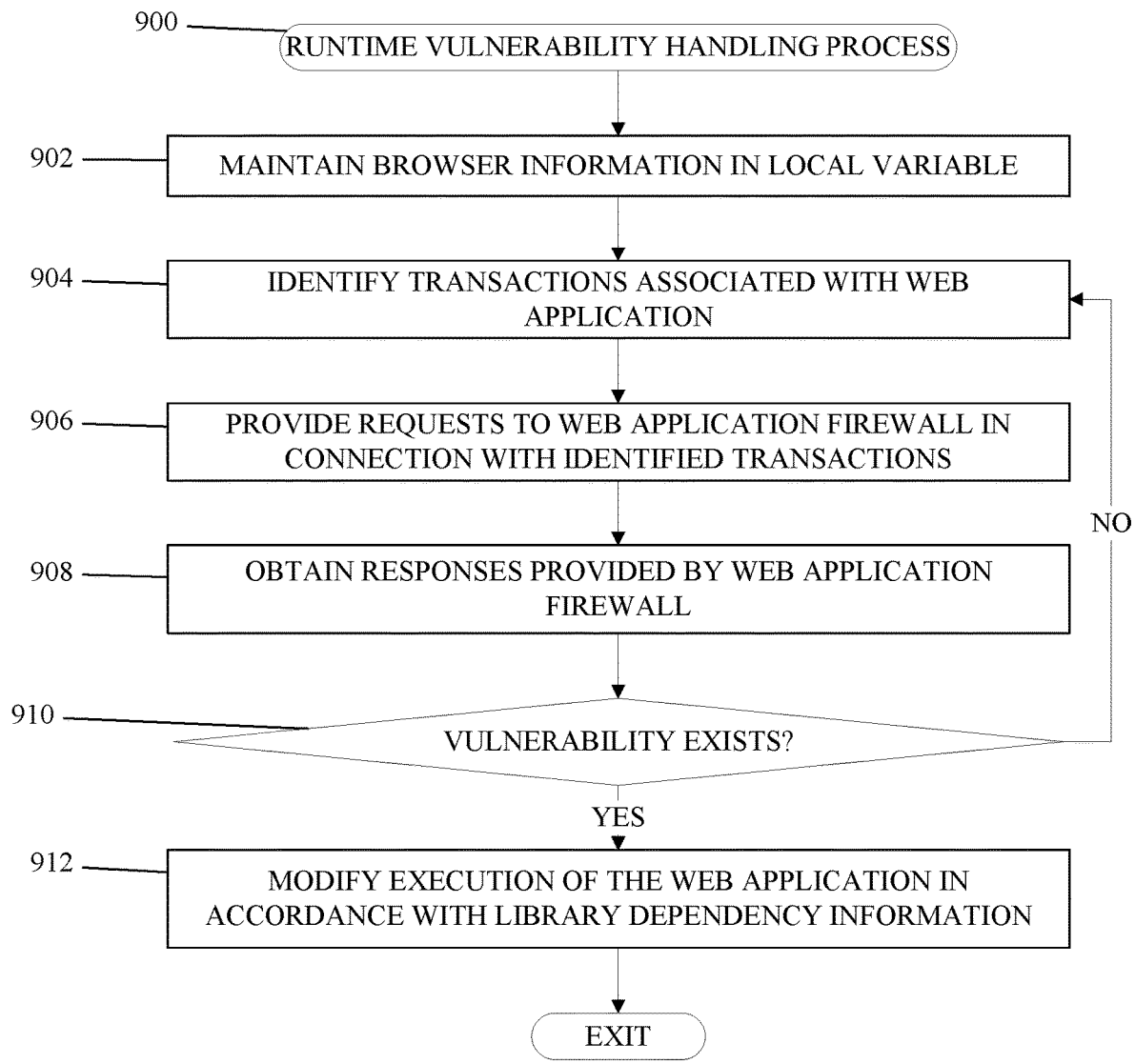
FIG. 9 is a flow diagram illustrating a runtime vulnerability handling process suitable for implementation by a client application at a client device in the computing system of FIG. 1 in connection with the runtime vulnerability detection process of FIG. 6 according to some example implementations.

FIG. 9 depicts an exemplary runtime vulnerability handling process 900 suitable for implementation by a client in connection with the vulnerability detection process 600 to secure an active instance of a web application utilizing a vulnerable library retrieved from a third party source (e.g., third party system 150) and perform additional tasks, functions, and/or operations described herein. For illustrative purposes, the following description may refer to elements mentioned above in connection with FIG. 1. It should be appreciated that the runtime vulnerability handling process 900 may include any number of additional or alternative tasks, the tasks need not be performed in the illustrated order and/or the tasks may be performed concurrently, and/or the runtime vulnerability handling process 900 may be incorporated into a more comprehensive procedure or process having additional functionality not described in detail herein. Moreover, one or more of the tasks shown and described in the context of FIG. 9 could be omitted from a practical implementation of the runtime vulnerability handling process 900 as long as the intended overall functionality remains intact.

In exemplary implementations, the runtime vulnerability handling process 900 initializes or otherwise begins in response to receiving injected executable code for a client-side vulnerability handling service from a web application firewall associated with a virtual web application 140 being provided to a client application 109. The runtime vulnerability handling process 900 stores, preserves or otherwise maintains web browser information in a local variable for subsequent reference by the client-side vulnerability handling service (task 902). In this regard, execution of the injected executable code provided by the web application firewall 130 causes the client application 109 to generate or otherwise provide the client-side vulnerability handling service that identifies or otherwise obtains information identifying the particular web browser type and/or version associated with the client application 109 and then stores or otherwise maintains the web browser information in a JavaScript local variable.

The runtime vulnerability handling process 900 continues by detecting or otherwise identifying transactions associated with the web application at the client and automatically generates or otherwise provides corresponding requests to the web application firewall in response to respective transactions within the context of the web application (tasks 904, 906). In this regard, in exemplary implementations, the client-side vulnerability handling service identifies or otherwise detects any sort of data transaction occurring within the client application 109 in the context of the web application 140, including, but not limited to, REST calls or other API calls, navigation to different hyperlinks or network addresses, and/or the like. For example, the client-side vulnerability handling service may be configurable to override XMLHttpRequest open methods, monitor link click events, monitor window navigation events, and/or the like. In exemplary implementations, the client-side vulnerability handling service analyzes the transaction event within the web browser to verify or otherwise determine whether the transaction involves the same network domain as the active instance of the web application 140 or a different network domain. When the transaction event involves the same network domain, the client-side vulnerability handling service transmits or otherwise provides the corresponding request to the web application firewall 130 in accordance with the logic defined for the web application 140. When the transaction event involves a different network domain, the client-side vulnerability handling service transmits or otherwise provides a dummy client request to the web application firewall 130 (e.g., a dummy REST GET call to the web application root endpoint), thereby ensuring the web application firewall 130 is notified of the transaction. As described above in the context of FIG. 6, in response to each received client request, the vulnerability controller service at the web application firewall 130 utilizes the associated session identifier identify the library dependency information 134 associated with the respective instance of the web application 140 and detect whether the respective instance of the web application 140 is potentially vulnerable (e.g., tasks 610, 612).

The runtime vulnerability handling process 900 continues by receiving or otherwise obtaining responses to client requests provided by the web application firewall and analyzing the responses to detect or otherwise identify when the response includes a vulnerability header indicative of a vulnerability associated with the active instance of the web application (tasks 908, 910). When the runtime vulnerability handling process 900 determines the active instance of the web application is potentially vulnerable, the runtime vulnerability handling process 900 augments, alters or otherwise modifies execution of the active instance of the web application in accordance with the library dependency information associated with the vulnerability (task 912). In this regard, after providing a request associated with a web application transaction event to the web application firewall 130, the client-side vulnerability handling service analyzes the corresponding response received from the web application firewall 130 to detect or otherwise identify whether the response include a vulnerability header injected by the vulnerability controller service at the web application firewall 130. When a response receives a vulnerability header, the client-side vulnerability handling service compares the web browser information maintained in a JavaScript local variable associated with the client application 109 to the library vulnerability information included in the vulnerability header to verify that the client application 109 is running in an applicable vulnerable web browser. When the client-side vulnerability handling service determines that the client application 109 is running in an applicable vulnerable web browser, the client-side vulnerability handling service utilizes the library dependency information and the fallback object information contained in the vulnerability header to automatically modify execution or operation of the instance of the web application 140 at the client device 108.

In one or more implementations, when the runtime vulnerability handling process 900 determines that the client application 109 is running in an applicable vulnerable web browser but the dependency associated with the vulnerable third party library 152 is low, the client-side vulnerability handling service allows the instance of the web application 140 to continue normal execution or operation but logs or otherwise records the vulnerability with the vulnerability controller service at the web application firewall 130, for example, by transmitting or otherwise providing notification of the detected vulnerability associated with the instance of the virtual web application 140 to an exposed REST API endpoint at the web application firewall 130 that is configured to receive information pertaining to detected vulnerabilities. In a similar manner as described above, the web application firewall 130 may record information detailing the detected vulnerabilities identified by different clients in connection with different instances of the virtual web application 140, such as, for example, information identifying the name of the library exhibiting the vulnerability, the version of the library exhibiting the vulnerability, information identifying the type and/or version of the vulnerable web browser being utilized, and/or the like. A service associated with the web application firewall 130 may subsequently generate or otherwise provide one or more reports, notifications, messages, and/or the like for the web application administrator based at least in part on the recorded detected vulnerability information, thereby allowing the web application administrator to review the detected vulnerabilities and make corresponding modifications to the web application 140. In some implementations, when the dependency associated with the vulnerable third party library 152 is low, the client-side vulnerability handling service allows the instance of the web application 140 to continue normal execution or operation but disables, deletes and/or deactivates the vulnerable third party library 152 to prevent further utilization of the vulnerable third party library 152.

In one or more implementations, when the runtime vulnerability handling process 900 determines that the dependency associated with the vulnerable third party library 152 is medium, the client-side vulnerability handling service allows the instance of the web application 140 to continue execution or operation but modifies or otherwise replaces one or more original third party JavaScript objects associated with the vulnerable third party library 152 with the designated fallback objects set forth in the vulnerability header for those objects. Additionally, the client-side vulnerability handling service may automatically generate or otherwise provide one or more user notifications within the client application 109 at the client application 109 to notify the user of the presence of a vulnerability and/or of the nature of the modifications to the functionality of the web application 140 resulting from the use of fallback objects in lieu of the original objects associated with the vulnerable third party library 152. The client-side vulnerability handling service may also log or otherwise record the medium level vulnerability with the vulnerability controller service at the web application firewall 130 in a similar manner as described above.

In one or more implementations, when the runtime vulnerability handling process 900 determines that the dependency associated with the vulnerable third party library 152 is high, the client-side vulnerability handling service automatically terminates, escapes or otherwise exits the instance of the virtual web application 140 to prevent further execution, implementation or utilization of the vulnerable third party library 152. Additionally, the client-side vulnerability handling service may automatically generate one or more user notifications within the client application 109 at the client application 109 to notify the user of the presence of a vulnerability and correspondingly provide one or more notifications to the web application firewall 130 to log or otherwise record detected vulnerability information before terminating the instance of the virtual web application 140 at the client device 108.

Referring again to FIGS. 6-9, by virtue of the WAF vulnerability handling service and the client-side vulnerability handling service, the runtime vulnerability handling process 900 allows for active instances of web applications to respond to vulnerabilities identified at or during runtime in an intelligent and fair manner, for example, by only terminating active instances of a web application that are associated with applicable vulnerable web browsers with respect to relatively high severity vulnerabilities while allowing continued execution of other active instances of the web application that are being accessed using non-vulnerable web browsers or where the severity of the potential vulnerabilities are relatively low. Moreover, fallback objects may be utilized to preserve or maintain operation of the active instances of the web application without reliance on objects in a vulnerable third party library. Most impacted users can be notified of the vulnerability, thereby improving user experience when a potentially vulnerable application is stopped as compared to a hard shutdown of an application server or web application across all users. Similarly, users not impacted by the vulnerability can continue access or use of the web application, thereby improving user experience by maintaining availability and usability of the web application (or API endpoints associated therewith) for a greater percentage of active users. Moreover, the library vulnerability information and library dependency information may be utilized by an administrator to provide a customized configuration for how vulnerabilities are handled at runtime without requiring any modifications or changes to the web application 140 or other modifications or changes at the application server 104 and/or the application platform 124.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 10A:
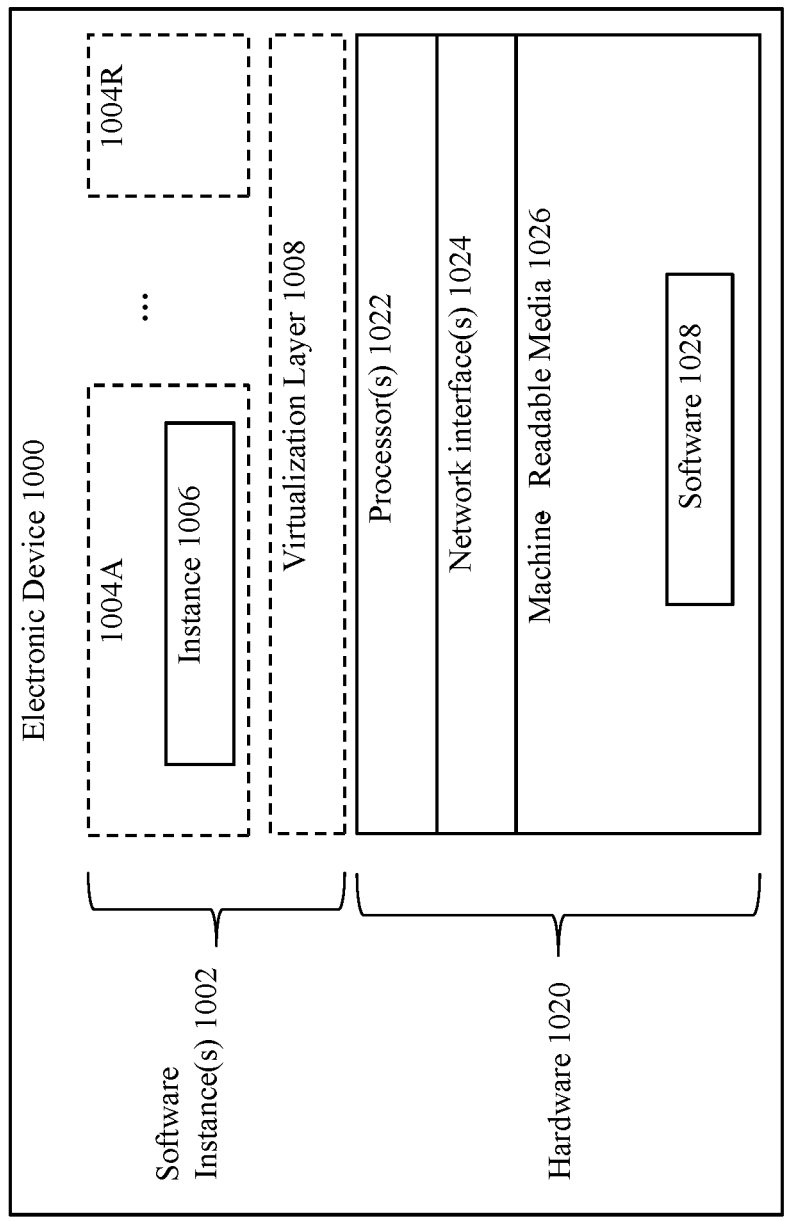
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and machine-readable media 1026 having stored therein software 1028 (which includes instructions executable by the set of one or more processor(s) 1022). The machine-readable media 1026 may include non-transitory and/or transitory machine-readable media. Each of the previously described clients, web application firewall services and client-side services may be implemented in one or more electronic devices 1000. In one implementation: 1) each of the clients is implemented in a separate one of the electronic devices 1000 (e.g., in end user devices where the software 1028 represents the software to implement clients to interface directly and/or indirectly with the web application firewall services and/or client-side services (e.g., software 1028 represents a web browser, a native client, a portal, a command-line interface, and/or an application programming interface (API) based upon protocols such as Simple Object Access Protocol (SOAP), Representational State Transfer (REST), etc.)); 2) the web application firewall services and/or client-side services is implemented in a separate set of one or more of the electronic devices 1000 (e.g., a set of one or more server devices where the software 1028 represents the software to implement the web application firewall services and/or client-side services); and 3) in operation, the electronic devices implementing the clients and the web application firewall services and/or client-side services would be communicatively coupled (e.g., by a network) and would establish between them (or through one or more other layers and/or or other services) connections for submitting requests to the web application firewall services and/or client-side services. Other configurations of electronic devices may be used in other implementations.

During operation, an instance of the software 1028 (illustrated as instance 1006 and referred to as a software instance; and in the more specific case of an application, as an application instance) is executed. In electronic devices that use compute virtualization, the set of one or more processor(s) 1022 typically execute software to instantiate a virtualization layer 1008 and one or more software container(s) 1004A-1004R (e.g., with operating system-level virtualization, the virtualization layer 1008 may represent a container engine (such as Docker Engine by Docker, Inc. or rkt in Container Linux by Red Hat, Inc.) running on top of (or integrated into) an operating system, and it allows for the creation of multiple software containers 1004A-1004R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-1004R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1028 is executed within the software container 1004A on the virtualization layer 1008. In electronic devices where compute virtualization is not used, the instance 1006 on top of a host operating system is executed on the "bare metal" electronic device 1000. The instantiation of the instance 1006, as well as the virtualization layer 1008 and software containers 1004A-1004R if implemented, are collectively referred to as software instance(s) 1002.

Alternative implementations of an electronic device may have numerous variations from that described above. For example, customized hardware and/or accelerators might also be used in an electronic device.

Figure 10B:
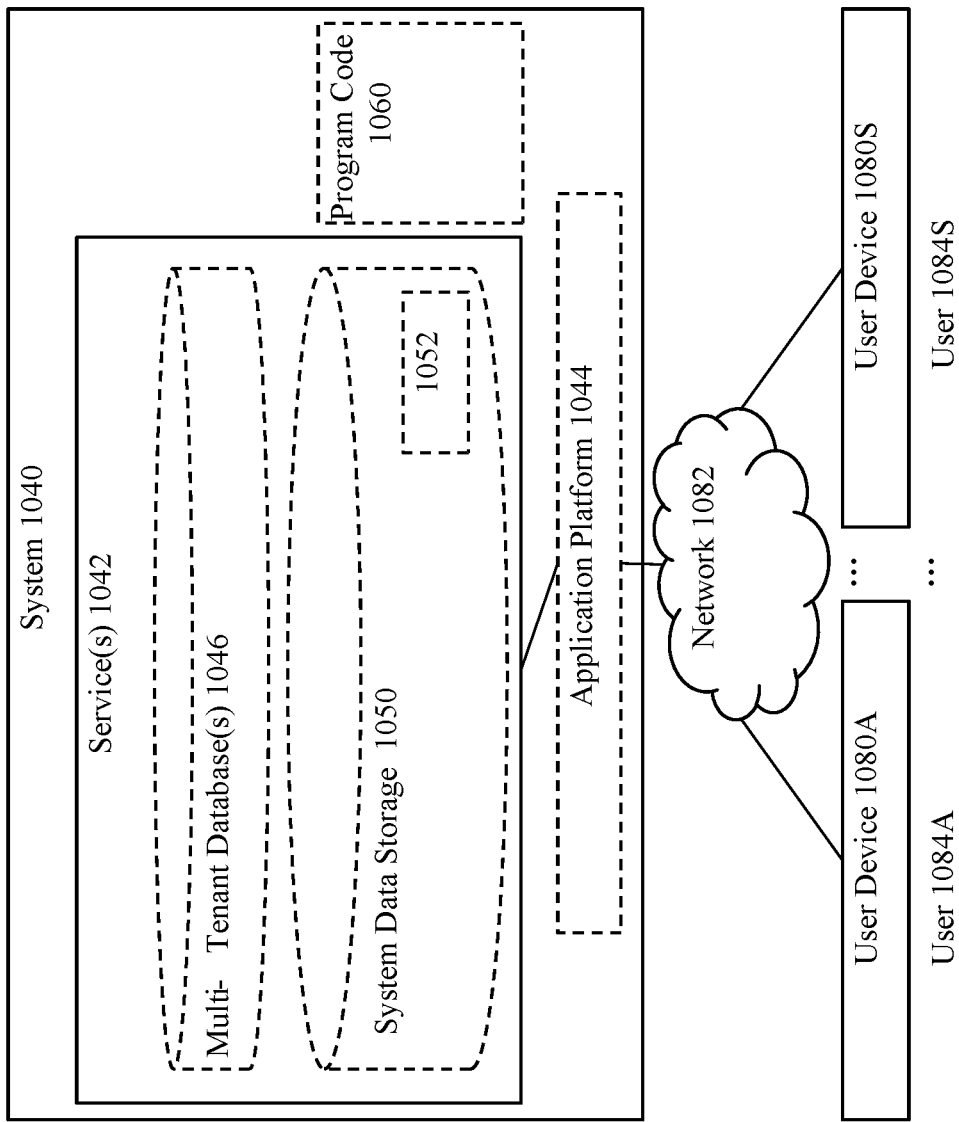
FIG. 10B is a block diagram of a deployment environment according to some example implementations.

FIG. 10B is a block diagram of a deployment environment according to some example implementations. A system 1040 includes hardware (e.g., a set of one or more server devices) and software to provide service(s) 1042, including web application firewall services and/or client-side services. In some implementations the system 1040 is in one or more datacenter(s). These datacenter(s) may be: 1) first party datacenter(s), which are datacenter(s) owned and/or operated by the same entity that provides and/or operates some or all of the software that provides the service(s) 1042; and/or 2) third-party datacenter(s), which are datacenter(s) owned and/or operated by one or more different entities than the entity that provides the service(s) 1042 (e.g., the different entities may host some or all of the software provided and/or operated by the entity that provides the service(s) 1042). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1040 is coupled to user devices 1080A-1080S over a network 1082. The service(s) 1042 may be on-demand services that are made available to one or more of the users 1084A-1084S working for one or more entities other than the entity which owns and/or operates the on-demand services (those users sometimes referred to as outside users) so that those entities need not be concerned with building and/or maintaining a system, but instead may make use of the service(s) 1042 when needed (e.g., when needed by the users 1084A-1084S). The service(s) 1042 may communicate with each other and/or with one or more of the user devices 1080A-1080S via one or more APIs (e.g., a REST API). In some implementations, the user devices 1080A-1080S are operated by users 1084A-1084S, and each may be operated as a client device and/or a server device. In some implementations, one or more of the user devices 1080A-1080S are separate ones of the electronic device 1000 or include one or more features of the electronic device 1000.

In some implementations, the system 1040 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1040 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1040 may include an application platform 1044 that enables PAAS for creating, managing, and executing one or more applications developed by the provider of the application platform 1044, users accessing the system 1040 via one or more of user devices 1080A-1080S, or third-party application developers accessing the system 1040 via one or more of user devices 1080A-1080S.

In some implementations, one or more of the service(s) 1042 may use one or more multi-tenant databases 1046, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user devices 1080A-1080S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the multi-tenant database(s) 1046 and/or system data storage 1050.

In some implementations, the service(s) 1042 are implemented using virtual applications dynamically created at run time responsive to queries from the user devices 1080A-1080S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the web application firewall services and/or client-side services, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1040 and the user devices 1080A-1080S.

Each user device 1080A-1080S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1040. For example, the user interface device can be used to access data and applications hosted by system 1040, and to perform searches on stored data, and otherwise allow one or more of users 1084A-1084S to interact with various GUI pages that may be presented to the one or more of users 1084A-1084S. User devices 1080A-1080S might communicate with system 1040 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1080A-1080S might include an HTTP client, commonly referred to as a "browser," for sending and receiving HTTP messages to and from server(s) of system 1040, thus allowing users 1084A-1084S of the user devices 1080A-1080S to access, process and view information, pages and applications available to it from system 1040 over network 1082.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of securely provisioning an instance of a web application from an application server to a client, the method comprising:
   receiving, at a web application firewall between the application server and the client, vulnerability information associated with the web application;
   generating, at the web application firewall, executable code for securing the instance of the web application based at least in part on the vulnerability information;
   injecting, by the web application firewall, the executable code into a file associated with the web application retrieved from the application server prior to providing the file to a web browser application at the client over a network; and
   thereafter detecting a vulnerable library associated with the instance of the web application, wherein the web browser application at the client executes the executable code within the file to provide a client-side library monitoring service configured in accordance with the vulnerability information to secure the instance of the web application in response to detecting the vulnerable library.

2. The method of claim 1, wherein detecting the vulnerable library comprises:
   determining a hash value of a function contained in a library retrieved from a third party system;
   comparing the hash value of the function contained in the library to a reference hash value for a vulnerable function; and
   identifying the library as the vulnerable library when the hash value of the function contained in the library retrieved from the third party system matches the reference hash value.

3. The method of claim 2, wherein determining the hash value comprises:
   converting contents of the function into a string representation; and
   inputting the string representation of the contents of the function into a hashing algorithm to obtain the hash value.

4. The method of claim 3, wherein receiving the vulnerability information comprises receiving at least one of the reference hash value for the vulnerable function and indication of the hashing algorithm selected by a web application administrator.

5. The method of claim 2, further comprising:
   identifying one of an obfuscated format or an unobfuscated format as a format of the function contained in the library; and
   selecting the reference hash value associated with the identified one of the obfuscated format or the unobfuscated format.

6. The method of claim 1, wherein:
   receiving the vulnerability information comprises receiving indication of a vulnerable function associated with a library to be retrieved from a third party system in connection with the instance of the web application; and
   generating the executable code comprises automatically generating executable code for a function detection component configurable to detect presence of a function corresponding to the vulnerable function within the library.

7. The method of claim 1, wherein the client-side library monitoring service is configurable to identify a function contained in a library retrieved from a third party system corresponding to a vulnerable function defined by the vulnerability information, determining a hash value of the identified function, comparing the hash value of the identified function contained in the library to a reference hash value for the vulnerable function, and identifying the library as the vulnerable library when the hash value of the identified function matches the reference hash value for the vulnerable function.

8. The method of claim 7, wherein the client-side library monitoring service is configurable to terminate the instance of the web application within the web browser application in response to identifying the library as the vulnerable library.

9. A method of securely provisioning an instance of a web application from an application server to a client, the method comprising:
receiving, at a web application firewall between the application server and the client, vulnerability information associated with the web application;
generating, at the web application firewall, executable code for securing the instance of the web application based at least in part on the vulnerability information;
providing, by the web application firewall, the executable code to the client over a network; and
thereafter:
obtaining, at the web application firewall, library vulnerability information associated with a third party library;
comparing, at the web application firewall, the library vulnerability information with library dependency information associated with the web application to determine whether the web application includes the third party library; and
providing, by the web application firewall, a vulnerability header in a response to the client, wherein:
the vulnerability header identifies the third party library and applicable web browser vulnerability information associated with the third party library; and
the client identifies the third party library as a vulnerable library when the applicable web browser vulnerability information in the vulnerability header corresponds to a web browser application being utilized to access the instance of the web application at the client.

10. The method of claim 1, wherein:
the file comprises a HyperText Markup Language (HTML) file associated with the web application; and
the executable code comprises JavaScript incorporated into the HTML file.

11. The method of claim 9, wherein providing the executable code to the client over the network comprises the web application firewall injecting the executable code into a file associated with the web application retrieved from the application server.

12. The method of claim 11, wherein detecting the vulnerable library comprises the web browser application at the client executing the executable code to provide a client-side library monitoring service configured in accordance with the vulnerability information.

13. The method of claim 11, wherein:
injecting the executable code comprises the web application firewall incorporating JavaScript into a HyperText Markup Language (HTML) file associated with the web application retrieved from the application server prior to providing the HTML file to the web browser application at the client; and
detecting the vulnerable library comprises the web browser application at the client executing the JavaScript within the HTML file to provide a client-side library monitoring service configured in accordance with the vulnerability information.

14. The method of claim 9, wherein:
the vulnerability header identifies a fallback object for the third party library; and
the client automatically configures the instance of the web application at the client to utilize the fallback object in lieu of an original object of the third party library in response to identifying the third party library as the vulnerable library.

15. The method of claim 9, wherein:
the vulnerability header identifies a dependency level associated with the third party library; and
the client automatically terminates the instance of the web application at the client based on the dependency level in response to identifying the third party library as the vulnerable library.

16. At least one non-transitory machine-readable storage medium that provides instructions that, when executed by at least one processor, are configurable to cause the at least one processor to perform operations comprising:
receiving, at a web application firewall between an application server and a client, vulnerability information associated with a web application;
generating, at the web application firewall, executable code for securing an instance of the web application based at least in part on the vulnerability information;
providing, by the web application firewall, the executable code to the client over a network by injecting the executable code into a file associated with the web application retrieved from the application server prior to providing the file to a web browser application at the client; and
thereafter detecting a vulnerable library associated with the instance of the web application, wherein the web browser application at the client executes the executable code within the file to provide a client-side library monitoring service configured in accordance with the vulnerability information to secure the instance of the web application in response to detecting the vulnerable library.

17. The non-transitory machine-readable storage medium of claim 16, wherein the instructions are configurable to cause the at least one processor to detect the vulnerable library by:
determining a hash value of a function contained in a library retrieved from a third party system;
comparing the hash value of the function contained in the library to a reference hash value for a vulnerable function; and
identifying the library as the vulnerable library when the hash value of the function contained in the library retrieved from the third party system matches the reference hash value.

18. The non-transitory machine-readable storage medium of claim 16, wherein the instructions are configurable to cause the at least one processor to:
obtain, at the web application firewall, indication of a vulnerable function associated with a library to be retrieved from a third party system in connection with the instance of the web application; and automatically generate the executable code for a function detection component configurable to detect presence of a function corresponding to the vulnerable function within the library at the client.

19. The non-transitory machine-readable storage medium of claim 16, wherein the instructions are configurable to cause the at least one processor to:

obtain library vulnerability information associated with a third party library; and compare the library vulnerability information with library dependency information associated with the web application to determine whether the web application includes the third party library, wherein:

the client identifies the third party library as the vulnerable library when applicable web browser vulnerability information in the library vulnerability information corresponds to the web browser application being utilized to access the instance of the web application at the client.

20. The non-transitory machine-readable storage medium of claim 19, wherein the client automatically configures the instance of the web application at the client to utilize a fallback object in lieu of an original object of the third party library in response to identifying the third party library as the vulnerable library.

\* \* \* \* \*